(12) United States Patent
Sakamoto et al.

(10) Patent No.: US 12,031,957 B2
(45) Date of Patent: Jul. 9, 2024

(54) ION SUPPRESSOR

(71) Applicant: SHIMADZU CORPORATION, Kyoto (JP)

(72) Inventors: Katsumasa Sakamoto, Kyoto (JP); Masanori Fujiwara, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 444 days.

(21) Appl. No.: 17/442,200

(22) PCT Filed: Mar. 27, 2019

(86) PCT No.: PCT/JP2019/013389
§ 371 (c)(1),
(2) Date: Sep. 23, 2021

(87) PCT Pub. No.: WO2020/194609
PCT Pub. Date: Oct. 1, 2020

(65) Prior Publication Data
US 2022/0187254 A1 Jun. 16, 2022

(51) Int. Cl.
*G01N 30/96* (2006.01)
*B01D 15/36* (2006.01)
*G01N 30/02* (2006.01)

(52) U.S. Cl.
CPC ............ *G01N 30/02* (2013.01); *B01D 15/367* (2013.01); *G01N 30/96* (2013.01)

(58) Field of Classification Search
CPC .. G01N 30/02; G01N 30/96; G01N 2030/965; B01D 15/361; B01D 15/367;
(Continued)

(56) References Cited

U.S. PATENT DOCUMENTS 2,073,991 A * 3/1937 Koser .................... B01D 29/05
210/489
4,728,422 A * 3/1988 Bailey .................... B01D 39/10
209/403
(Continued)

FOREIGN PATENT DOCUMENTS

CN       101762195 A     6/2010
WO    2019/021352 A1    1/2019

OTHER PUBLICATIONS

English Translation of Patent Publication CN 101762195A, Published Jun. 2010. (Year: 2010).*
(Continued)

*Primary Examiner* — Joseph W Drodge
(74) *Attorney, Agent, or Firm* — Renner, Otto, Boisselle & Sklar, LLP

(57) ABSTRACT

First and second electrode liquid seal members are arranged between a first electrode and a second electrode. First and second ion exchange membranes are arranged between the first electrode liquid seal member and the second electrode liquid seal member. An eluent seal member is arranged between the first ion exchange membrane and the second ion exchange membrane. A plurality of first mesh members having different charge amounts are stacked in a first electrode liquid flow path of the first electrode liquid seal member. Each of the plurality of first mesh members is constituted by a first wire group composed of a plurality of first wires and a second wire group composed of a plurality of second wires crossing the first wire group. The plurality of first wire groups of the plurality of first mesh members respectively extend in different directions, and the plurality of second wire groups of the plurality of first mesh members respectively extend in different directions and extend in
(Continued)

directions different from those of the plurality of first wire groups.

7 Claims, 8 Drawing Sheets

(58) Field of Classification Search
CPC .................. B01D 61/46; B01D 61/463; B01D 2311/2623; B01D 2311/2627; B01D 2321/22; C02F 1/42; C02F 1/44; C02F 1/469; C02F 1/4693; C02F 29/56; C02F 29/58; C02F 39/10; C02F 39/12; C02F 39/2027; C02F 2201/422; C02F 2201/425; C02F 2201/46105; C02F 2201/46115; C02F 2201/4618
USPC .......................................... 210/488, 489, 499
See application file for complete search history.

(56) References Cited

U.S. PATENT DOCUMENTS

| | | | | |
|---|---|---|---|---|
| 4,999,098 A | * | 3/1991 | Pohl | ........................ G01N 30/84 204/522 |
| 5,045,204 A | * | 9/1991 | Dasgupta | ........... B01D 19/0031 210/635 |
| 6,077,434 A | * | 6/2000 | Srinivasan | ............. G01N 30/96 204/542 |
| 2007/0068866 A1 | * | 3/2007 | Kneezel | ................ B41J 2/17563 137/833 |
| 2010/0157533 A1 | | 6/2010 | Oniki et al. | |
| 2020/0132639 A1 | | 4/2020 | Sakamoto | |
| 2020/0240968 A1 | * | 7/2020 | Srinivasan | ............. G01N 30/96 |

OTHER PUBLICATIONS

English Translation of Patent Publication WO 2019021352A1, Published Jan. 2019. (Year: 2019).*
Office Action for corresponding Chinese patent application No. 201980094616.0 dated Nov. 28, 2022, with English machine translation.
International Search Report for corresponding Application No. PCT/JP2019/013389, mailed Jul. 2, 20019.
Written Opinion for corresponding Application No. PCT/JP2019/013389, mailed July 2, 20019 (English machine translation).

* cited by examiner

ION SUPPRESSOR

TECHNICAL FIELD

The present invention relates to an ion suppressor.

BACKGROUND ART

In an ion chromatograph, a sample to be analyzed is introduced into a separation column together with an eluent. The sample passes through the separation column, so that the sample is separated into ion species compounds and introduced into a flow cell of a detector together with the eluent. An electrical conductance of the sample introduced into the flow cell is sequentially detected, so that a chromatogram is generated. An ion suppressor may be arranged between the separation column and the detector.

In an ion suppressor as described in Patent Document 1, a pair of ion exchange membranes are arranged between a first regeneration liquid flow path support and a second regeneration liquid flow path support, and an eluent flow path support is arranged between the paired ion exchange membranes. An eluent flow path, a first regeneration liquid flow path, and a second regeneration liquid flow path are formed in the eluent flow path support, the first regeneration liquid flow path support, and the second regeneration liquid flow path support, respectively. A mesh material having a unique charge amount is filled in each of the eluent flow path, the first regeneration liquid flow path, and the second regeneration liquid flow path.

An eluent from a separation column is introduced into the eluent flow path and then arrives at an electrical conductance meter. The eluent that has passed through the electrical conductance meter is introduced into the first regeneration liquid flow path and the second regeneration liquid flow path as a regeneration liquid. Ion exchange is carried out by electrodialysis between the eluent of the eluent flow path and the first and second regeneration liquid flow paths, so that electrical conductivity of the eluent is reduced. Thus, the background of the chromatogram is reduced and analysis accuracy of the sample is improved.

[Patent Document 1] WO 2019/021352 A1

SUMMARY OF INVENTION

Technical Problem

Patent Document 1 describes that a plurality of mesh materials having different charge amounts are stacked and arranged in the first regeneration liquid flow path or the second regeneration liquid flow path. Also, Patent Document 1 describes that with this configuration, deterioration of the ion exchange membranes between the first or second regeneration liquid flow path and the eluent flow path is inhibited while current efficiency in the electrodialysis is improved, and thus the life of the ion suppressor can be increased. However, when the plurality of mesh materials are stacked, clogging is liable to occur in the mesh materials and, therefore, durability of the mesh materials may be reduced, and deterioration of the mesh materials may be promoted. In this case, it becomes difficult to increase the life of the ion suppressor.

An object of the present invention is to provide an ion suppressor that can easily have a longer life.

Solution to Problem

One aspect according the present invention is directed to an ion suppressor that carries out ion exchange between an eluent and an electrode liquid from a separation column of an ion chromatograph and includes first and second electrodes, first and second electrode liquid seal members arranged between the first electrode and the second electrode, first and second ion exchange membranes arranged between the first electrode liquid seal member and the second electrode liquid seal member, and an eluent seal member arranged between the first ion exchange membrane and the second ion exchange membrane and having an eluent flow path for allowing the eluent to pass through, wherein the first electrode liquid seal member has a first electrode liquid flow path for allowing the electrode liquid to pass through, the second electrode liquid seal member has a second electrode liquid flow path for allowing the electrode liquid to pass through, a plurality of first mesh members having different charge amounts are stacked in the first electrode liquid flow path of the first electrode liquid seal member, each of the plurality of first mesh members is constituted by a first wire group composed of a plurality of first wires and a second wire group composed of a plurality of second wires crossing the first wire group, the plurality of first wire groups of the plurality of first mesh members respectively extend in different directions, and the plurality of second wire groups of the plurality of first mesh members respectively extend in different directions and extend in directions different from the directions of the plurality of first wire groups.

Advantageous Effects of Invention

According to the present invention, the life of the ion suppressor can easily be increased.

DESCRIPTION OF EMBODIMENTS

(1) Configuration of Ion Chromatograph

Figure 1:
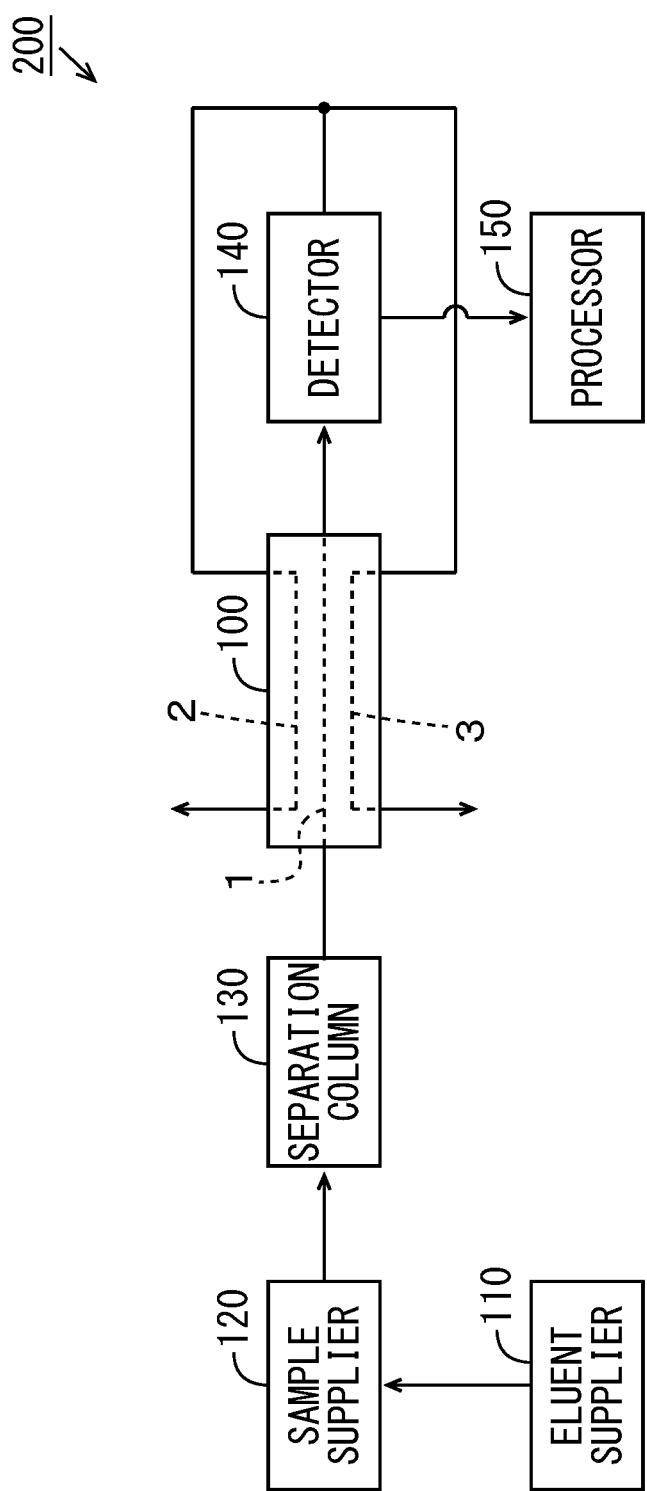
FIG. 1 is a diagram showing a configuration of an ion chromatograph including an ion suppressor according to one embodiment of the present invention.

An ion suppressor according to embodiments of the present invention will be described in detail below with reference to the drawings. FIG. 1 is a diagram showing the configuration of an ion chromatograph including the ion suppressor according to one embodiment of the present invention. As shown in FIG. 1, the ion chromatograph 200 includes the ion suppressor 100, an eluent supplier 110, a sample supplier 120, a separation column 130, a detector 140, and a processor 150.

The eluent supplier 110 includes a chemical liquid bottle, a liquid sending pump, and a degassing device, for example, and supplies an eluent such as an aqueous solution as a mobile phase. The sample supplier 120 is an injector, for example, and introduces a sample to be analyzed to the separation column 130 together with the eluent supplied by the eluent supplier 110. The separation column 130 is stored in a column oven not shown and adjusted to a predetermined constant temperature. The separation column 130 separates the introduced sample into ion species components.

The detector 140 is an electrical conductance detector and sequentially detects the electrical conductances of the sample and the eluent that have passed through the ion suppressor 100 from the separation column 130. The processor 150 processes a result of detection by the detector 140 to generate a chromatogram representing a relationship between a retention time of each ion species component and the electrical conductances.

The ion suppressor 100 has an eluent flow path 1 and electrode liquid flow paths 2, 3 and is arranged between the separation column 130 and the detector 140. The sample and the eluent, which have passed through the separation column 130 are led to the detector 140 through the eluent flow path 1. Further, the eluent, which has passed through the detector 140 passes through the electrode liquid flow paths 2, 3 as an electrode liquid, and is then discarded. In the ion suppressor 100, ion exchange is carried out by electrodialysis, so that the electrical conductance of the eluent, which has passed through the eluent flow path 1 is reduced. Details of the ion suppressor 100 will be described below.

(2) Configuration of Ion Suppressor

Figure 2:
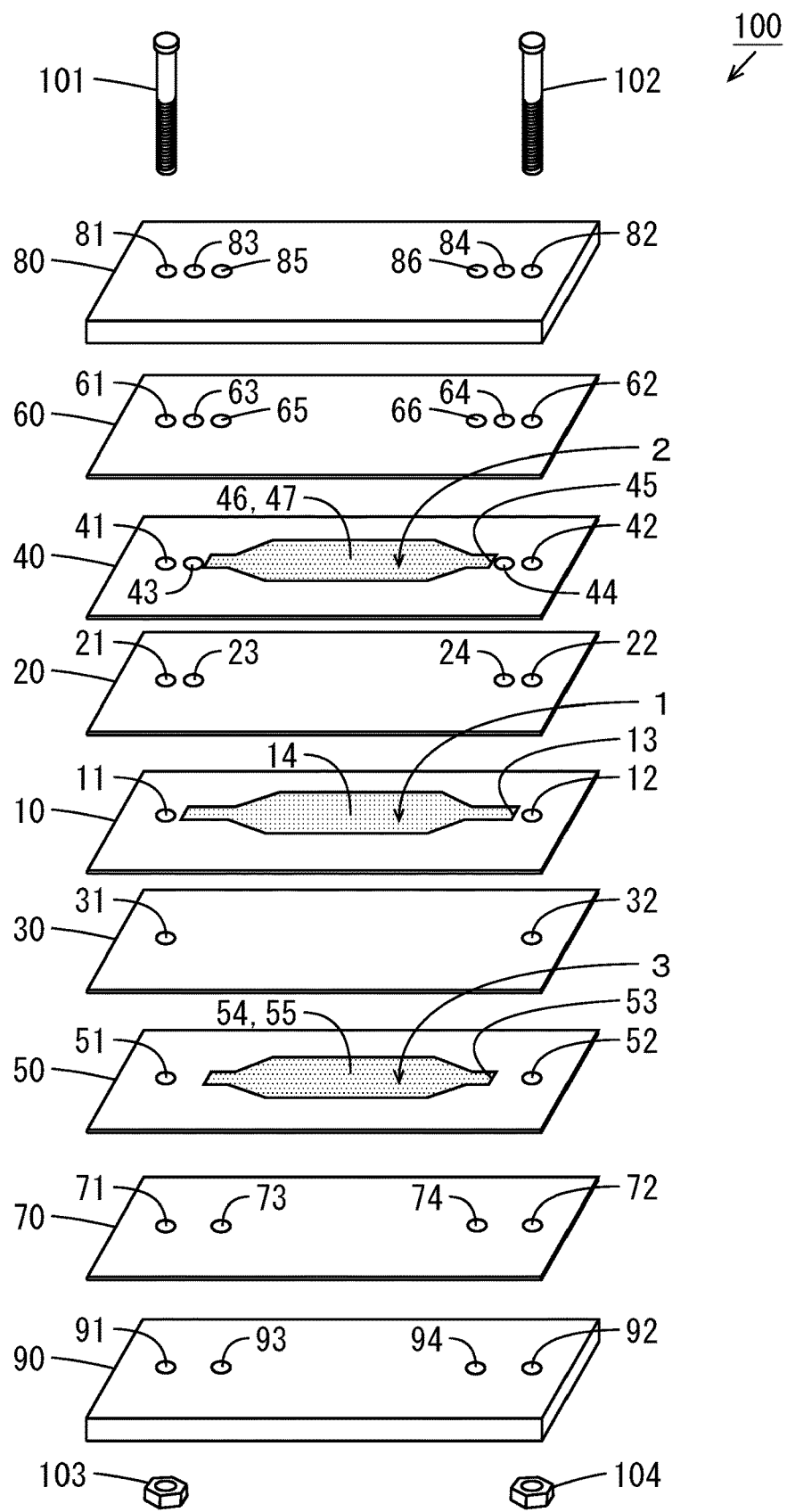
FIG. 2 is an exploded perspective view showing the configuration of the ion suppressor of FIG. 1.

FIG. 2 is an exploded perspective view showing the configuration of the ion suppressor 100 of FIG. 1. As shown in FIG. 2, the ion suppressor 100 includes an eluent seal member 10, a pair of ion exchange membranes 20, 30, a pair of electrode liquid seal members 40, 50, a pair of electrodes 60, 70, and a pair of support members 80, 90. Each of the eluent seal member 10, the ion exchange membranes 20, 30, the electrode liquid seal members 40, 50, the electrodes 60, 70 and the support members 80, 90 has an elongated shape extending in one direction (hereinafter referred to as a flow-path direction).

The eluent seal member 10 has through holes 11, 12 and an opening 13. The through holes 11, 12 are respectively arranged in one end and another end in the flow-path direction. The opening 13 is arranged between the through hole 11 and the through hole 12 to extend in the flow-path direction. The space in the opening 13 constitutes the eluent flow path 1. In the present embodiment, a mesh member 14 is provided in the eluent flow path 1.

The ion exchange membranes 20, 30 are cation exchange membranes in a case where ions to be measured are anions, and are anion exchange membranes in a case where ions to be measured are cations. The ion exchange membrane 20 has through holes 21 to 24. The through holes 21, 23 are arranged in one end in the flow-path direction in this order from the one end toward the other end. The through holes 22, 24 are arranged in the other end in the flow-path direction in this order from the other end toward the one end. The ion exchange membrane 30 has through holes 31, 32. The through holes 31, 32 are respectively arranged in one end and another end in the flow-path direction.

The electrode liquid seal member 40 has through holes 41 to 44 and an opening 45. The through holes 41, 43 are arranged in one end in the flow-path direction in this order from the one end toward another end. The through holes 42, 44 are arranged in the other end in the flow-path direction in this order from the other end toward the one end. The opening 45 is arranged between the through hole 43 and the through hole 44 to extend in the flow-path direction. The space in the opening 45 constitutes the electrode liquid flow path 2. Mesh members 46, 47 having different charge amounts are provided in the electrode liquid flow path 2.

The electrode liquid seal member 50 has through holes 51, 52 and an opening 53. The through holes 51, 52 are respectively arranged in one end and another end in the flow-path direction. The opening 53 is arranged between the through hole 51 and the through hole 52 to extend in the flow-path direction. The space in the opening 53 constitutes the electrode liquid flow path 3. Mesh members 54, 55 having different charge amounts are provided in the electrode liquid flow path 3. Details of the electrode liquid seal members 40, 50 will be described below.

The electrode 60 is an anode, for example, and has through holes 61 to 66. The through holes 61, 63, 65 are arranged in one end in the flow-path direction in this order from the one end toward another end. The through holes 62, 64, 66 are arranged in the other end in the flow-path direction in this order from the other end toward the one end. The electrode 70 is a cathode, for example, and has through holes 71 to 74. The through holes 71, 73 are arranged in one end in the flow-path direction in this order from the one end toward another end. The through holes 72, 74 are arranged in the other end in the flow-path direction in this order from the other end toward the one end.

The support member 80 is formed of a resin material, for example, and has through holes 81 to 86. The through holes 81, 83, 85 are arranged in one end in the flow-path direction in this order from the one end toward another end. The through holes 82, 84, 86 are arranged in the other end in the flow-path direction in this order from the other end toward the one end. The support member 90 is formed of a material similar to that of the support member 80 and has through holes 91 to 94. The through holes 91, 93 are arranged in one end in the flow-path direction in this order from the one end toward another end. The through holes 92, 94 are arranged in the other end in the flow-path direction in this order from the other end toward the one end.

The support member 80, the electrode 60, the electrode liquid seal member 40, the ion exchange membrane 20, the eluent seal member 10, the ion exchange membrane 30, the electrode liquid seal member 50, the electrode 70, and the support member 90 are stacked in this order from above toward below in a top-and-bottom direction. In this case, the through holes 81, 61, 41, 21, 11, 31, 51, 71, 91 overlap with one another in one end of the ion suppressor 100. The through holes 82, 62, 42, 22, 12, 32, 52, 72, 92 overlap with one another in another end of the ion suppressor 100.

Further, the eluent flow path 1 and the electrode liquid flow path 2 are opposite to each other with the ion exchange membrane 20 sandwiched therebetween, and the eluent flow path 1 and the electrode liquid flow path 3 are opposite to each other with the ion exchange membrane 30 sandwiched therebetween. The through holes 83, 63, 43, 23 overlap with one end of the eluent flow path 1, and the through holes 84, 64, 44, 24 overlap with another end of the eluent flow path 1. The through holes 85, 65 overlap with one end of the electrode liquid flow path 2, and the through holes 86, 66 overlap with another end of the electrode liquid flow path 2. The through holes 93, 73 overlap with one end of the electrode liquid flow path 3, and the through holes 94, 74 overlap with another end of the electrode liquid flow path 3.

Here, a screw member 101 is inserted into the through holes 81, 61, 41, 21, 11, 31, 51, 71, 91 from above toward below, and a screw member 102 is inserted into the through holes 82, 62, 42, 22, 12, 32, 52, 72, 92 from above toward below. Nuts 103, 104 are attached to lower ends of the screw members 101, 102, respectively. Thus, with the eluent seal member 10, the ion exchange membranes 20, 30, the electrode liquid seal members 40, 50 and the electrodes 60, 70 integrally supported by the support members 80, 90, the ion suppressor 100 is assembled.

(3) Electrode Liquid Seal Member

Figure 3:
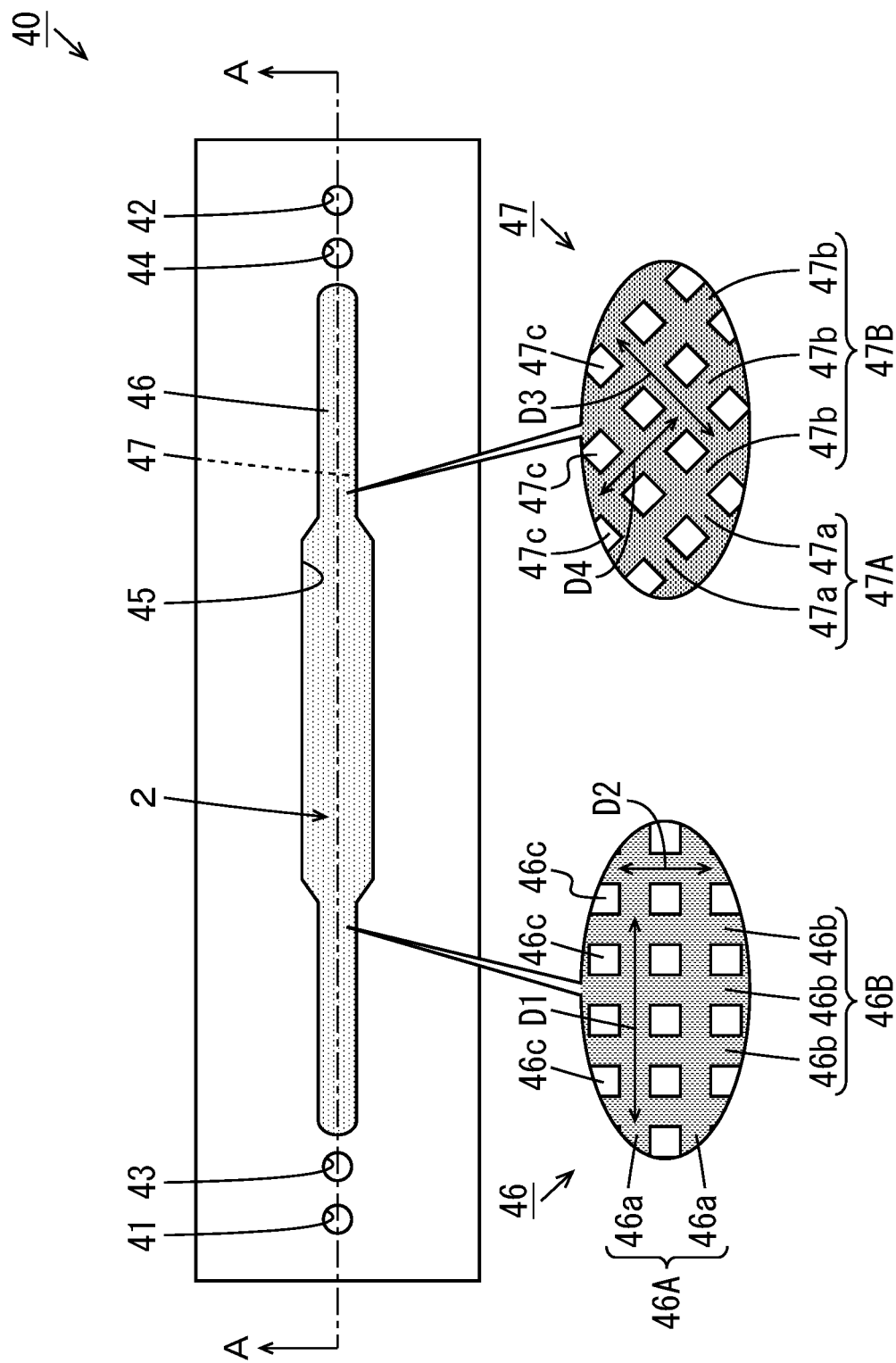
FIG. 3 is a plan view of one of electrode liquid seal members of FIG. 2.
Figure 4:
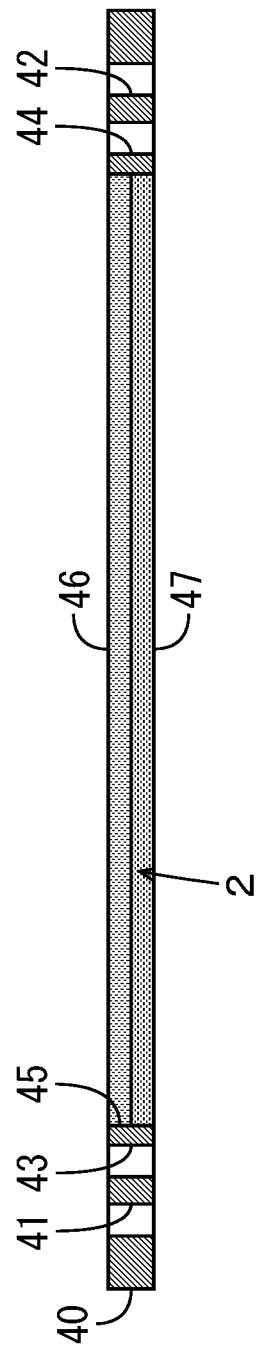
FIG. 4 is a cross sectional view taken along the line A-A of the electrode liquid seal member of FIG. 3.

FIG. 3 is a plan view of the one electrode liquid seal member 40 of FIG. 2. FIG. 4 is a cross sectional view taken along the line A-A of the electrode liquid seal member 40 of FIG. 3. Also, FIG. 3 shows a partially enlarged view of the electrode liquid seal member 40. As shown in FIG. 3, the electrode liquid seal member 40 is formed of a resin material or a rubber material and has a rectangular shape extending in the flow-path direction.

As described above, the through holes 41, 43 are formed in the one end of the electrode liquid seal member 40 in the flow-path direction. The through holes 42, 44 are formed in the other end of the electrode liquid seal member 40 in the flow-path direction. The through holes 41, 43 are arranged in this order from the one end toward the other end, and the through holes 42, 44 are arranged in this order from the other end toward the one end.

The opening 45 is formed between the through hole 43 and the through hole 44 to extend in the flow-path direction. In this embodiment, the width of the opening 45 in the vicinity of a central portion in the flow-path direction is larger than those of the opening 45 in the vicinities of the one end and the other end. The space in the opening 45 constitutes the electrode liquid flow path 2. As shown in FIG. 4, the mesh member 46 and the mesh member 47 are provided in a stacked manner in the space in the opening 45. The charge amount of the mesh member 46 is larger than that of the mesh member 47.

As shown in a left enlarged portion of FIG. 3, the mesh member 46 is constituted by wire groups 46A, 46B crossing each other. The wire group 46A includes a plurality of wires 46a extending in parallel to a first direction D1, and the wire group 46B includes a plurality of wires 46b extending in parallel to a second direction D2. Each of regions surrounded by the plurality of wires 46a and the plurality of wires 46b constitutes a hole 46c. While the first direction D1 and the second direction D2 cross each other at a 90 degree angle and each hole 46c has a square shape in this embodiment, the embodiment is not limited to this. Each hole 46c may have a rectangular shape, or the first direction D1 and the second direction D2 may cross each other at an angle other than the 90 degree angle.

As shown in a right enlarged portion of FIG. 3, the mesh member 47 is constituted by wire groups 47A, 47B crossing each other. The wire group 47A includes a plurality of wires 47a extending in parallel to a third direction D3, and the wire group 47B includes a plurality of wires 47b extending in parallel to a fourth direction D4. Each of regions surrounded by the plurality of wires 47a and the plurality of wires 47b constitutes a hole 47c. While the third direction D3 and the fourth direction D4 cross each other at a 90 degree angle and each hole 47c has a square shape in this embodiment, the embodiment is not limited to this. Each hole 47c may have a rectangular shape, or the third direction D3 and the fourth direction D4 may cross each other at an angle other than the 90 degree angle.

Figure 5:
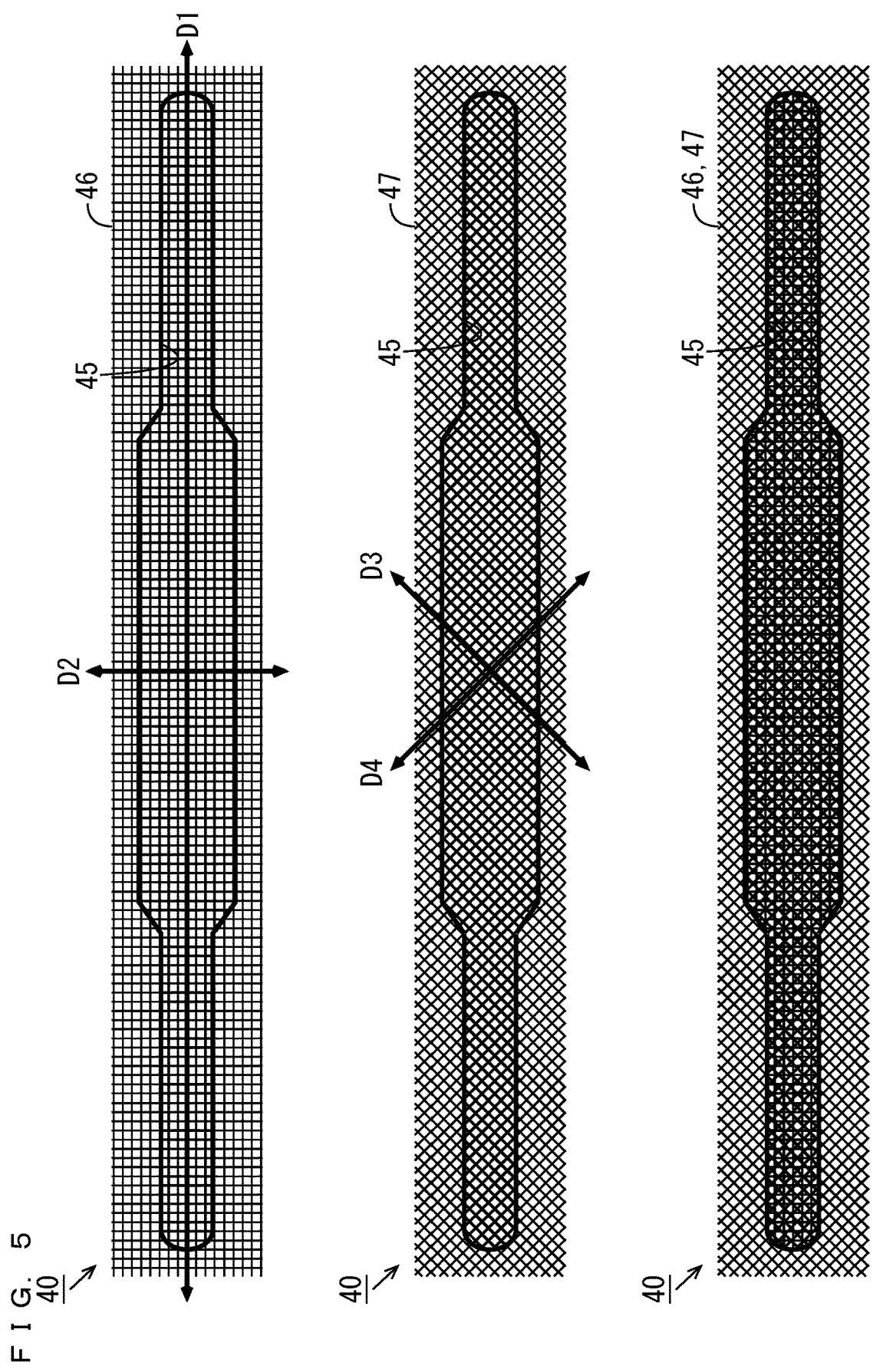
FIG. 5 is a diagram for explaining arrangement of mesh members.

FIG. 5 is a diagram for explaining arrangement of the mesh members 46, 47. In an upper illustration of FIG. 5, the mesh member 47 is not illustrated in order to facilitate visibility of the mesh member 46. In a middle illustration of FIG. 5, the mesh member 46 is not illustrated in order to facilitate visibility of the mesh member 47. In a lower illustration of FIG. 5, both of the mesh members 47, 47 are illustrated.

As shown in the upper illustration and the middle illustration of FIG. 5, the mesh members 46, 47 are stacked such that the first direction D1 crosses the third and fourth directions D3, D4 and the second direction D2 crosses the third and fourth directions D3, D4. A crossing angle of the first direction D1 and the third and fourth directions D3, D4 is, for example, not less than 5 degrees and not more than 85 degrees. Similarly, a crossing angle of the second direction D2 and the third and fourth directions D3, D4 is, for example, not less than 5 degrees and not more than 85 degrees.

In the arrangement of the mesh members 46, 47 as described above, the wire groups 46A, 46B, 47A, 47B respectively extend in different directions. In this case, as shown in the lower illustration of FIG. 5, the holes of the one mesh member are inhibited from being closed by the wires of the other mesh member. As such, it is not necessary to stack the mesh member 46 and the mesh member 47 in precise alignment with each other. This makes it possible to easily prevent occurrence of clogging in the mesh members 46, 47.

In this embodiment, two base materials (precursors of the electrode liquid seal member 40) each having an opening are prepared, and these base materials are heated and pressed with the mesh members 46, 47 sandwiched therebetween. As such, the electrode liquid seal member 40 is manufactured, and also the mesh members 46, 47 are arranged in the opening 45. In this manufacturing method, part of the mesh members 46, 47 may remain between the two base materials. The arrangement method of the mesh members 46, 47 is not limited to the embodiment. For example, the mesh members 46, 47 processed in the shape of the opening 45 may be joined to an inner wall of the opening 45 after the electrode liquid seal member 40 is manufactured.

Figure 6:
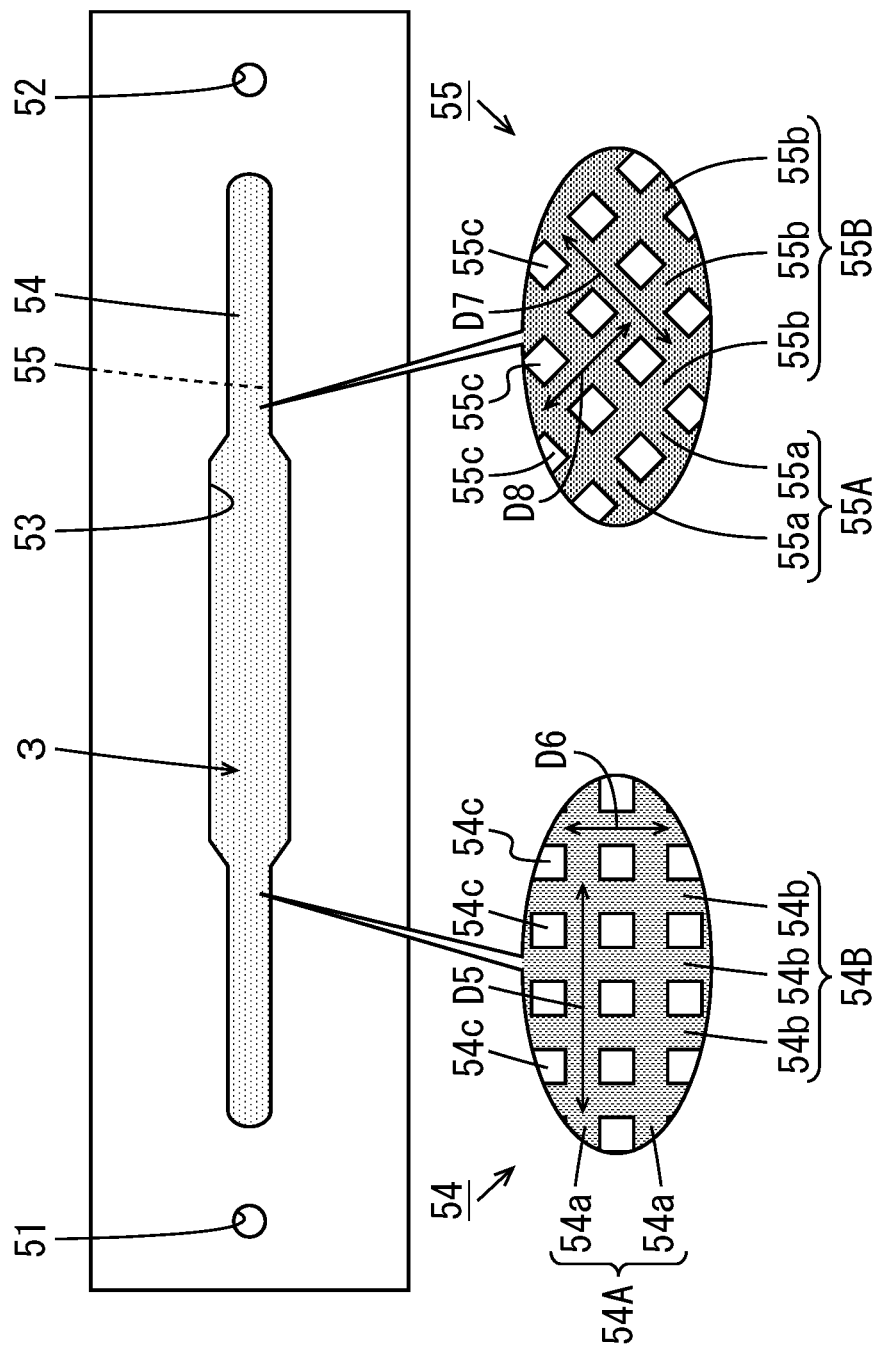
FIG. 6 is a plan view of the other electrode liquid seal member of FIG. 2.

Since the other electrode liquid seal member 50 has a configuration similar to that of the one electrode liquid seal member 40, the electrode liquid seal member 50 will not be described in detail but described briefly. FIG. 6 is a plan view of the other electrode liquid seal member 50 of FIG. 2. Also, FIG. 6 shows a partially enlarged view of the electrode liquid seal member 50. As shown in FIG. 6, the electrode liquid seal member 50 has a material and a shape similar to those of the electrode liquid seal member 40.

As describe above, the through holes 51, 52 are respectively arranged in the one end and the other end of the electrode liquid seal member 50 in the flow-path direction. The opening 53 is formed between the through hole 51 and the through hole 52. The shape of the opening 53 is similar to that of the opening 45 of the electrode liquid seal member 40. The space in the opening 53 constitutes the electrode liquid flow path 3. The mesh member 54 and the mesh member 55 are provided in a stacked manner in the space in the opening 53. The charge amount of the mesh member 54 is larger than that of the mesh member 55.

As shown in a left enlarged portion of FIG. 6, the mesh member 54 is constituted by wire groups 54A, 54B crossing each other. The wire group 54A includes a plurality of wires 54a extending in parallel to a fifth direction D5, and the wire group 54B includes a plurality of wires 54b extending in parallel to a sixth direction D6. Each of regions surrounded by the plurality of wires 54a and the plurality of wires 54b constitutes a hole 54c.

As shown in a right enlarged portion of FIG. 6, the mesh member 55 is constituted by wire groups 55A, 55B crossing each other. The wire group 55A includes a plurality of wires 55a extending in parallel to a seventh direction D7, and the wire group 55B includes a plurality of wires 55b extending in parallel to an eighth direction D8. Each of regions surrounded by the plurality of wires 55a and the plurality of wires 55b constitutes a hole 55c.

The mesh members 54, 55 are stacked such that the fifth direction D5 crosses the seventh and eighth directions D7, D8, and the sixth direction D6 crosses the seventh and eighth directions D7, D8. A crossing angle of the fifth direction D5 and the seventh and eighth directions D7, D8 is, for example, not less than 5 degrees and not more than 85 degrees. Similarly, a crossing angle of the sixth direction D6 and the seventh and eighth directions D7, D8 is, for example, not less than 5 degrees and not more than 85 degrees.

In the arrangement as described above, the wire groups 54A, 54B, 55A, 55B respectively extend in different directions. In this case, the holes of the one mesh member are inhibited from being closed by the wires of the other mesh member. As such, it is not necessary to stack the mesh member 54 and the mesh member 55 in precise alignment with each other. This makes it possible to easily prevent occurrence of clogging in the mesh members 54, 55.

(4) Reference Example

Figure 7:
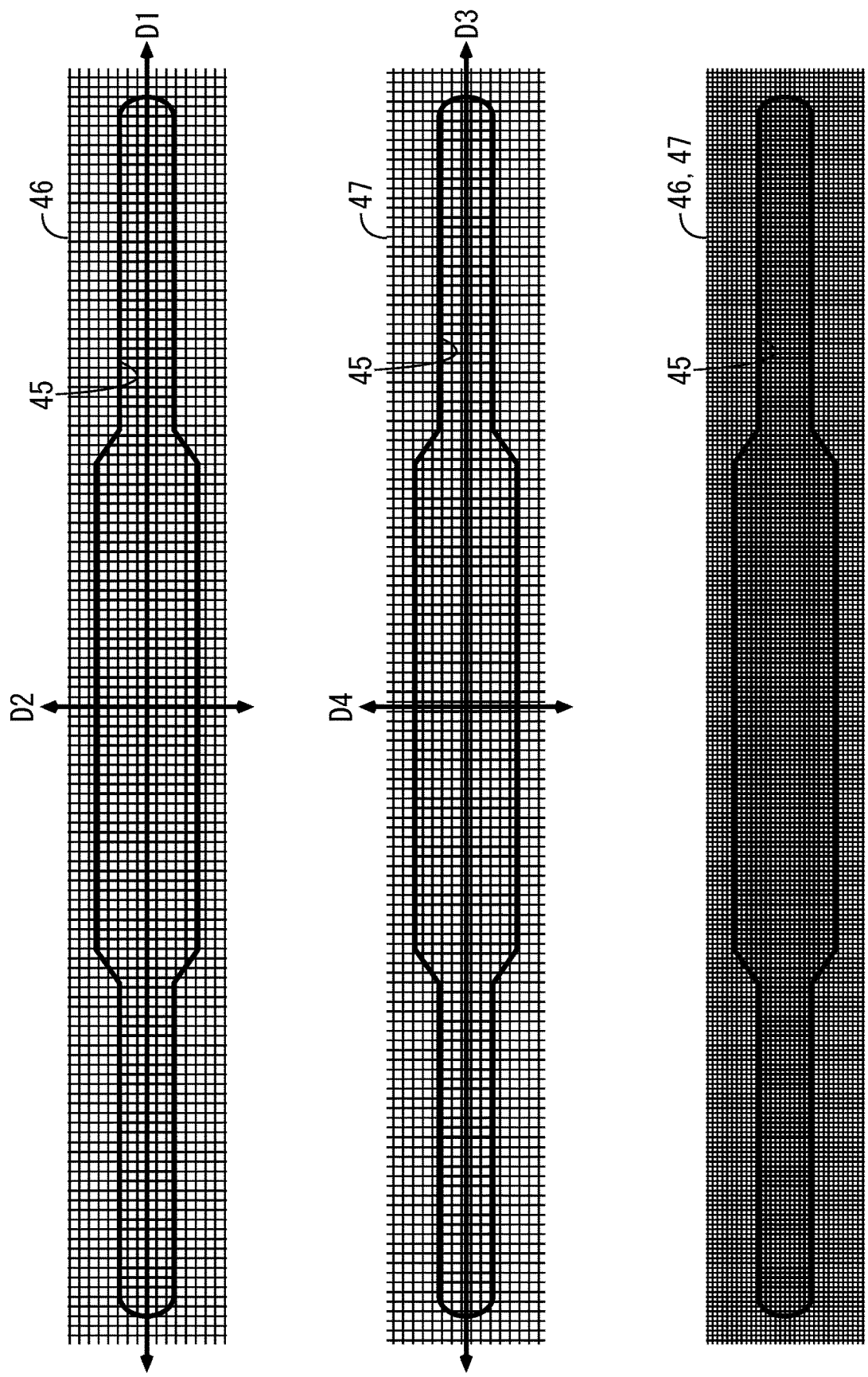
FIG. 7 is a diagram for explaining arrangement of the mesh members in a reference example.

FIG. 7 is a diagram for explaining the arrangement of the mesh members 46, 47 in a reference example. In an upper illustration of FIG. 7, the mesh member 47 is not illustrated in order to facilitate visibility of the mesh member 46. In a middle illustration of FIG. 7, the mesh member 46 is not illustrated in order to facilitate visibility of the mesh member 47. In a lower illustration of FIG. 7, both of the mesh members 46, 47 are illustrated.

As shown in the upper and middle illustrations of FIG. 7, in the reference example, the mesh members 46, 47 are stacked such that the first direction D1 and the third direction D3 are in parallel, and the second direction D2 and the fourth direction D4 are in parallel. In this case, large part of the holes of the one mesh member are closed by the wires of the other mesh member as shown in the lower illustration of FIG. 7 unless the mesh member 46 and the mesh member 47 are in precise alignment with each other. As such, clogging is liable to occur in the mesh members 46, 47.

(5) Operation of Ion Suppressor

Figure 8:
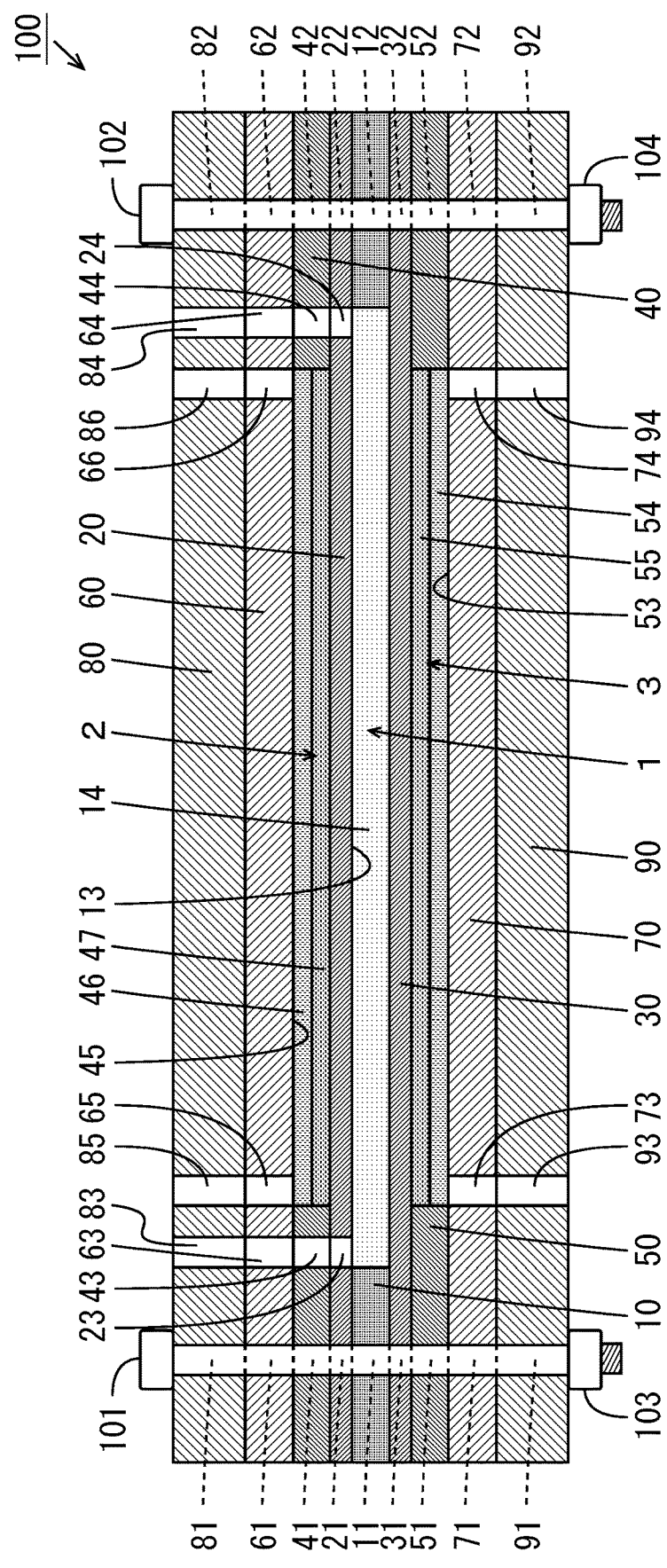
FIG. 8 is a diagram for explaining an operation of the ion suppressor of FIG. 2.

FIG. 8 is a diagram for explaining the operation of the ion suppressor of FIG. 2. The eluent containing the sample, which has passed through the separation column 130 of FIG. 1 is introduced from the one end of the ion suppressor 100 of FIG. 8 into the eluent flow path 1 through the through holes 83, 63, 43, 23 and then flows through the eluent flow path 1 toward the other end. After that, the eluent is introduced from the other end of the ion suppressor 100 to the detector 140 of FIG. 1 through the through holes 24, 44, 64, 84. As described above, the electrical conductances of the sample and the eluent are sequentially detected in the detector 140.

The eluent that has passed through the detector 140 is branched into two electrode liquids. One of the electrode liquids is introduced from the other end of the ion suppressor 100 into the electrode liquid flow path 2 through the through holes 86, 66 and then flows through the electrode liquid flow path 2 toward the one end. After that, the one electrode liquid is discharged outside through the through holes 65, 85 from the one end of the ion suppressor 100. The other electrode liquid is introduced from the other end of the ion suppressor 100 into the electrode liquid flow path 3 through the through holes 94, 74 and then flows through the electrode liquid flow path 3 toward the one end. After that, the other electrode liquid is discharged outside through the through holes 73, 93 from the one end of the ion suppressor 100.

A positive voltage is applied to the electrode 60, and a negative voltage is applied to the electrode 70. In this case, by electrolysis of water, hydrogen ions and oxygen molecules are generated in the electrode liquid flow path 2, and hydroxide ions and hydrogen molecules are generated in the electrode liquid flow path 3. The hydrogen ions generated in the electrode liquid flow path 2 permeate the ion exchange membrane 20, move to the eluent flow path 1, and are then replaced with cations such as sodium ions or potassium ions contained in the eluent in the eluent flow path 1. The cations replaced with the hydrogen ions permeate the ion exchange membrane 30, move to the electrode liquid flow path 3, bond to the hydrogen ions in the electrode liquid flow path 3, and are then discharged together with the electrode liquid.

With the above-described operation, ion exchange is carried out between the eluent that moves through the eluent flow path 1 and the electrode liquids that move through the electrode liquid flow paths 2, 3, so that the electrical conductance of the eluent that has passed through the eluent flow path 1 is reduced. Thus, the background of the chromatogram generated by the processor 150 of FIG. 1 is reduced. As a result, the analysis accuracy of the sample can be improved.

Also, in this embodiment, the mesh member 46 having a larger charge amount is arranged closer to the electrode 60 than the mesh member 47, and the mesh member 54 having a larger charge amount is arranged closer to the electrode 70 than the mesh member 55. Thus, a suitable charge amount distribution is formed with respect to a stacked direction (the top-and-bottom direction) of the ion suppressor 100. Specifically, the charge amount around the electrodes 60, 70 is increased, whereas the charge amount around the eluent flow path 1 is reduced.

With this arrangement, an oxidation-reduction reaction is efficiently promoted around the electrodes 60, 70. Therefore, ions can be generated without uneven ion concentration. On the other hand, resistances of ion conduction between the electrode liquid flowing through the electrode liquid flow path 2 and the eluent flowing through the eluent flow path 1 and between the eluent flowing through the eluent flow path 1 and the electrode liquid flowing through the electrode liquid flow path 3 are increased. In this case, a flow of excessive currents is prevented, so that local generation of bubbles in the electrode liquid flow paths 2, 3 is inhibited. As a result, local deterioration of the ion exchange membranes 20, 30 is inhibited, and thus the life of the ion suppressor 100 is further increased.

(6) Effects

In the ion suppressor 100 according to this embodiment, the electrode liquid seal members 40, 50 are arranged between the electrode 60 and the electrode 70. The ion exchange membranes 20, 30 are arranged between the electrode liquid seal member 40 and the electrode liquid seal member 50. The eluent seal member 10 is arranged between the ion exchange membrane 20 and the ion exchange membrane 30. The plurality of mesh members 46, 47 having different charge amounts are stacked in the electrode liquid flow path 2 of the electrode liquid seal member 40. The plurality of mesh members 54, 55 having different charge amounts are stacked in the electrode liquid flow path 3 of the electrode liquid seal member 50.

The mesh member 46 is constituted by the wire group 46A composed of the plurality of wires 46a and the wire group 46B composed of the plurality of wires 46b crossing the wire group 46A. The mesh member 47 is constituted by the wire group 47A composed of the plurality of wires 47a and the wire group 47B composed of the plurality of wires 47b crossing the wire group 47A. The wire groups 46A, 46B, 47A, 47B respectively extend in the different directions.

With this configuration, even in a case where the plurality of mesh members 46, 47 are stacked, the holes of one of the mesh members 46, 47 are inhibited from being closed by the wire groups of the other mesh member. In this case, it is not necessary to stack the mesh members 46, 47 in precise alignment with each other and, therefore, it is possible to easily prevent occurrence of clogging in each of the mesh members 46, 47. Moreover, since no excessive pressure is applied to each mesh member 46, 47, durability of each mesh member 46, 47 is increased, and thus each mesh member 46, 47 is unlikely to be deteriorated.

Similarly, the mesh member 54 is constituted by the wire group 54A composed of the plurality of wires 54a and the wire group 54B composed of the plurality of wires 54b crossing the wire group 54A. The mesh member 55 is constituted by the wire group 55A composed of the plurality of wires 55a and the wire group 55B composed of the plurality of wires 55b crossing the wire group 55A. The wire groups 54A, 54B, 55A, 55B respectively extend in the different directions.

With this configuration, even in a case where the plurality of mesh members 54, 55 are stacked, the holes of one of the mesh members 54, 55 are inhibited from being closed by the wire groups of the other mesh member. In this case, it is not necessary to stack the mesh members 54, 55 in precise alignment with each other and, therefore, it is possible to easily prevent occurrence of clogging in each of the mesh members 54, 55. Moreover, since no excessive pressure is applied to each mesh member 54, 55, durability of each mesh member 54, 55 is increased, and thus each mesh member 54, 55 is unlikely to be deteriorated. As a result, the life of the ion suppressor 100 can be easily increased.

(7) Other Embodiments (a) While the two mesh members 46, 47 are stacked in the electrode liquid flow path 2 of the electrode liquid seal member 40 in the above-described embodiment, the embodiment is not limited to this. Three or more mesh members may be stacked in the electrode liquid flow path 2. In this case, a plurality of mesh members are stacked such that a plurality of wires of the plurality of mesh members respectively extend in different directions in the electrode liquid flow path 2.

Similarly, while the two mesh members 54, 55 are stacked in the electrode liquid flow path 3 of the electrode liquid seal member 50 in the above-described embodiment, the embodiment is not limited to this. Three or more mesh members may be stacked in the electrode liquid flow path 3. In this case, a plurality of mesh members are stacked such that a plurality of wires of the plurality of mesh members respectively extend in different directions in the electrode liquid flow path 3.

Also, the number of the mesh members stacked in the electrode liquid flow path 2 may be the same as or different from the number of the mesh members stacked in the electrode liquid flow path 3. Moreover, the plurality of mesh members may be staked in any one of the electrode liquid flow paths 2, 3, and one mesh member may be arranged in the other of the electrode liquid flow paths 2, 3.

Here, the amount of hydrogen molecules generated in the electrode liquid flow path 3 being a cathode-side flow path is approximately twice the amount of oxygen molecules generated in the electrode liquid flow path 2 being an anode-side flow path. That is, a larger amount of gas (bubbles) is generated in the electrode liquid flow path 3 than in the electrode liquid flow path 2. As a result of having carried out various experiments and studies, the present inventors have discovered that efficiency of dialysis may be reduced in a case where such a larger amount of bubbles causes a reverse flow of the electrode liquid in the electrode liquid flow path 3.

As such, the number of the mesh members stacked in the electrode liquid flow path 2 may be larger than that of the mesh members arranged or stacked in the electrode liquid flow path 3. In this case, a flow path resistance in the electrode liquid flow path 3 becomes smaller than that in the electrode liquid flow path 2 and, therefore, a larger amount of electrode liquid is easily supplied to the electrode liquid flow path 3 than the electrode liquid flow path 2. Thus, the reverse flow of the electrode liquid is inhibited even in the case where the large amount of bubbles is generated in the electrode liquid flow path 3. This makes it possible to prevent a reduction in efficiency of dialysis due to the reverse flow of the electrode liquid in the electrode liquid flow path 3.

(b) While the through holes 24, 44, 64, 84 for introducing the eluent into the eluent flow path 1 are formed in the ion exchange membrane 20, the electrode liquid seal member 40, the electrode 60, and the support member 80, respectively in the above-described embodiment, the embodiment is not limited to this. A plurality of through holes for introducing the eluent into the eluent flow path 1 may be formed in the ion exchange membrane 30, the electrode liquid seal member 50, the electrode 70, and the support member 90, respectively.

Similarly, while the through holes 23, 43, 63, 83 for discharging the eluent from the eluent flow path 1 are formed in the ion exchange membrane 20, the electrode liquid seal member 40, the electrode 60, and the support member 80, respectively in the above-described embodiment, the embodiment is not limited to this. A plurality of through holes for discharging the eluent from the eluent flow path 1 may be formed in the ion exchange membrane 30, the electrode liquid seal member 50, the electrode 70, and the support member 90, respectively.

(c) While the eluent discharged from the detector 140 is supplied to the electrode liquid flow paths 2, 3 as the electrode liquid in the above-described embodiment, the embodiment is not limited to this. Another separately prepared eluent may be supplied to the electrode liquid flow paths 2, 3 as the electrode liquid.

(d) While the one end and the other end of the ion suppressor 100 are secured by the two screw members 101, 102 in the above-described embodiment, the embodiment is not limited to this. For example, the vicinity of the four corners of the ion suppressor 100 may be secured by four screw members. Also, in a case where the through holes 91, 92 of the support member 90 are screw holes, the nuts 103, 104 need not be attached to the screw members 101, 102.

(8) Aspect (Item 1) An ion suppressor that carries out ion exchange between an eluent and an electrode liquid from a separation column of an ion chromatograph according to one aspect may include:

first and second electrodes;

first and second electrode liquid seal members arranged between the first electrode and the second electrode;

first and second ion exchange membranes arranged between the first electrode liquid seal member and the second electrode liquid seal member; and an eluent seal member arranged between the first ion exchange membrane and the second ion exchange membrane and having an eluent flow path for allowing an eluent to pass through, the first electrode liquid seal member may have a first electrode liquid flow path for allowing the electrode liquid to pass through, the second electrode liquid seal member may have a second electrode liquid flow path for allowing the electrode liquid to pass through, a plurality of first mesh members having different charge amounts may be stacked in the first electrode liquid flow path of the first electrode liquid seal member, each of the plurality of first mesh members may be constituted by a first wire group composed of a plurality of first wires and a second wire group composed of a plurality of second wires crossing the first wire group, and the plurality of first wire groups of the plurality of first mesh members may respectively extend in different directions, and the plurality of second wire groups of the plurality of first mesh members may respectively extend in different directions and may extend in directions different from the directions of the plurality of first wire groups.

In the ion suppressor, the first and second electrode liquid seal members are arranged between the first electrode and the second electrode. The first and second ion exchange membranes are arranged between the first electrode liquid seal member and the second electrode liquid seal member. The eluent seal member is arranged between the first ion exchange membrane and the second ion exchange membrane. The plurality of first mesh members having different charge amounts are stacked in the first electrode liquid flow path of the first electrode liquid seal member.

Each of the plurality of first mesh members is constituted by the first wire group composed of the plurality of first wires and the second wire group composed of the plurality of second wires crossing the first wire group. The plurality of first wire groups of the plurality of first mesh members respectively extend in the different directions, and the plurality of second wire groups of the plurality of first mesh members respectively extend in the different directions and extend in the directions different from the directions of the plurality of first wire groups.

With this configuration, even in a case where the plurality of first mesh members are stacked, meshes of any of the first mesh members (holes formed by the first and second wire groups) are inhibited from being closed by the first or second wire group of another first mesh member. In this case, it is unnecessary to stack the plurality of first mesh members in precise alignment with one another and, therefore, it is possible to easily prevent occurrence of clogging in each first mesh member. Moreover, since no excessive pressure is applied to each first mesh member, durability of each first mesh member is increased, and thus each first mesh member is unlikely to be deteriorated. As a result, the life of the ion suppressor can be easily increased.

(Item 2) In the ion suppressor according to item 1, the plurality of first wire groups of the plurality of first mesh members may cross one another at an angle of not less than 5 degrees and not more than 85 degrees, and the plurality of second wire groups of the plurality of first mesh members may cross one another at an angle of not less than 5 degrees and not more than 85 degrees.

In this case, it is possible to more easily inhibit the meshes of any of the first mesh members from being closed by the first or second wire group of another first mesh member.

(Item 3) In the ion suppressor according to item 1 or 2, the plurality of first mesh members may be stacked with the first mesh member having a smaller charge amount arranged at a position closer to the eluent flow path.

In this case, a charge amount around one of the first and second electrodes is increased and, therefore, an oxidation-reduction reaction is efficiently promoted around the electrode. Therefore, ions can be generated without uneven ion concentration.

On the other hand, a charge amount around the eluent flow path is reduced and, therefore, a resistance of ion conduction between the electrode liquid flowing through the first electrode liquid flow path and the eluent flowing through the eluent flow path is increased. In this case, a flow of excessive currents is prevented, so that local generation of bubbles in the first electrode liquid flow path is inhibited. Thus, local deterioration of one of the ion exchange membranes is inhibited. As a result, the life of the ion suppressor can be increased.

(Item 4) In the ion suppressor according to item 1 or 2, a plurality of second mesh members having different charge amounts may be stacked in the second electrode liquid flow path of the second electrode liquid seal member, each of the plurality of second mesh members may be constituted by a third wire group composed of a plurality of third wires and a fourth wire group composed of a plurality of fourth wires crossing the third wire group, and the plurality of third wire groups of the plurality of second mesh members may respectively extend in different directions, and the plurality of fourth wire groups of the plurality of second mesh members may respectively extend in different directions and may extend in directions different from the directions of the plurality of third wire groups.

With this configuration, even in a case where the plurality of second mesh members are stacked, meshes of any of the second mesh members (holes formed by the third and fourth wire groups) are inhibited from being closed by the third or fourth wire group of another second mesh member. In this case, it is unnecessary to stack the plurality of second mesh members in precise alignment with one another and, therefore, it is possible to easily prevent occurrence of clogging in each second mesh member. Moreover, since no excessive pressure is applied to each second mesh member, durability of each second mesh member is increased, and thus each second mesh member is unlikely to be deteriorated. As a result, the life of the ion suppressor can be easily increased.

(Item 5) In the ion suppressor according to item 4,
the plurality of third wire groups of the plurality of second mesh members may cross one another at an angle of not less than 5 degrees and not more than 85 degrees, and
the plurality of fourth wire groups of the plurality of second mesh members may cross one another at an angle of not less than 5 degrees and not more than 85 degrees.

In this case, it is possible to more easily inhibit the meshes of any of the second mesh members from being closed by the third or fourth wire group of another second mesh member.

(Item 6) In the ion suppressor according to item 4,
the plurality of second mesh members may be stacked with the second mesh member having a smaller charge amount arranged at a position closer to the eluent flow path.

In this case, the charge amount around the other of the first and second electrodes is increased and, therefore, the oxidation-reduction reaction is efficiently promoted around the other electrode. Therefore, ions can be generated without uneven ion concentration.

On the other hand, the charge amount around the eluent flow path is reduced and, therefore, a resistance of ion conduction between the electrode liquid flowing through the second electrode liquid flow path and the eluent flowing through the eluent flow path is increased. In this case, a flow of excessive currents is prevented, so that local generation of bubbles in the second electrode liquid flow path is inhibited. Thus, local deterioration of the other of the ion exchange membranes is inhibited. As a result, the life of the ion suppressor can be increased.

(Item 7) In the ion suppressor according to item 1 or 2,
the first electrode may be an anode to which a positive voltage is applied,
the second electrode may be a cathode to which a negative voltage is applied,
one or a plurality of second mesh members may be arranged or stacked in the second electrode liquid flow path of the second electrode liquid seal member, and
a number of the first mesh members stacked in the first electrode liquid flow path may be larger than a number of the second mesh members arranged or stacked in the second electrode liquid flow path.

The amount of hydrogen molecules generated in the second electrode liquid flow path being a cathode-side flow path is approximately twice the amount of oxygen molecules generated in the first electrode liquid flow path being an anode-side flow path. That is, a larger amount of gas (bubbles) is generated in the second electrode liquid flow path than in the first electrode liquid flow path. As a result of having carried out various experiments and studies, the present inventors have discovered that efficiency of dialysis may be reduced in a case where such a larger amount of bubbles causes a reverse flow of the electrode liquid in the second electrode liquid flow path.

With the above-described configuration, a flow path resistance in the second electrode liquid flow path becomes smaller than that in the first electrode liquid flow path and, therefore, a larger amount of electrode liquid is easily supplied to the second electrode liquid flow path than the first electrode liquid flow path. Thus, the reverse flow of the electrode liquid is inhibited even in the case where the large amount of bubbles is generated in the second electrode liquid flow path. This makes it possible to easily prevent a reduction in efficiency of dialysis due to the reverse flow of the electrode liquid in the second electrode liquid flow path.

The invention claimed is:

1. An ion suppressor that carries out ion exchange between an eluent and an electrode liquid from a separation column of an ion chromatograph, comprising:
   first and second electrodes;
   first and second electrode liquid seal members arranged between the first electrode and the second electrode;
   first and second ion exchange membranes arranged between the first electrode liquid seal member and the second electrode liquid seal member; and
   an eluent seal member arranged between the first ion exchange membrane and the second ion exchange membrane and having an eluent flow path for allowing an eluent to pass through,
   wherein the first electrode liquid seal member has a first electrode liquid flow path for allowing the electrode liquid to pass through,
   the second electrode liquid seal member has a second electrode liquid flow path for allowing the electrode liquid to pass through,
   a plurality of first mesh members having different charge amounts are stacked in the first electrode liquid flow path of the first electrode liquid seal member,
   each of the plurality of first mesh members is comprised by a first wire group comprising a plurality of first wires and a second wire group comprising a plurality of second wires crossing the first wire group, and
   the plurality of first wire groups of the plurality of first mesh members respectively extend in different directions, and the plurality of second wire groups of the plurality of first mesh members respectively extend in different directions and extend in directions different from the directions of the plurality of first wire groups.

2. The ion suppressor according to claim 1, wherein the plurality of first wire groups of the plurality of first mesh members cross one another at an angle of not less than 5 degrees and not more than 85 degrees, and
   the plurality of second wire groups of the plurality of first mesh members cross one another at an angle of not less than 5 degrees and not more than 85 degrees.

3. The ion suppressor according to claim 1, wherein
   the plurality of first mesh members are stacked with a first of the plurality of first mesh members having a smaller charge amount being arranged at a position closer to the eluent flow path than a second of the plurality of first mesh members having a larger charge amount.

4. The ion suppressor according to claim 1, wherein
   a plurality of second mesh members having different charge amounts are stacked in the second electrode liquid flow path of the second electrode liquid seal member,
   each of the plurality of second mesh members is comprised by a third wire group comprising a plurality of third wires and a fourth wire group comprising a plurality of fourth wires crossing the third wire group, and
   the plurality of third wire groups of the plurality of second mesh members respectively extend in different directions, and the plurality of fourth wire groups of the plurality of second mesh members respectively extend in different directions and extend in directions different from the directions of the plurality of third wire groups.

5. The ion suppressor according to claim 4, wherein the plurality of third wire groups of the plurality of second mesh members cross one another at an angle of not less than 5 degrees and not more than 85 degrees, and the plurality of fourth wire groups of the plurality of second mesh members cross one another at an angle of not less than 5 degrees and not more than 85 degrees.

6. The ion suppressor according to claim 4, wherein the plurality of second mesh members are stacked with a first of the plurality of second mesh members having a smaller charge amount being arranged at a position closer to the eluent flow path than a second of the plurality of second mesh members having a larger charge amount.

7. The ion suppressor according to claim 1, wherein the first electrode is an anode to which a positive voltage is applied,
- the second electrode is a cathode to which a negative voltage is applied,
- one or a plurality of second mesh members are arranged or stacked in the second electrode liquid flow path of the second electrode liquid seal member, and
- a number of the first mesh members stacked in the first electrode liquid flow path is larger than a number of the second mesh members arranged or stacked in the second electrode liquid flow path.

\* \* \* \* \*